W. H. Auld,
Circular Saw Mill.
N° 31,202.   Patented Jan. 22, 1861.
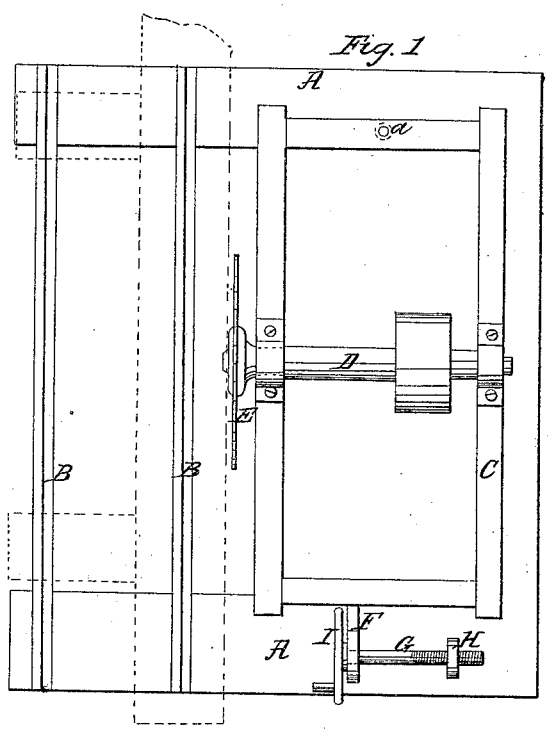
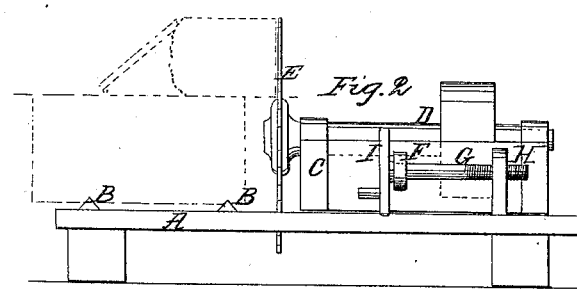
Witnesses  
J. Holcombe  
R. S. Spencer
Inventor:  
W. H. Auld  
per Munn & Co.  
Attorneys

UNITED STATES PATENT OFFICE.

W. H. AULD, OF FAIRFIELD, IOWA, ASSIGNOR TO HIMSELF AND R. C. BROWN, OF SAME PLACE.

CIRCULAR SAWING MACHINE.

Specification of Letters Patent No. 31,202, dated January 22, 1861.

*To all whom it may concern:*

Be it known that I, W. H. AULD, of Fairfield, in the county of Jefferson and State of Iowa, have invented a new and useful Improvement in Circular-Saw Mills; and I do hereby declare that the following is a full, clear, and exact description of the same, reference being had to the annexed drawings, making a part of this specification, in which—

Figure 1 is a plan or top view of my invention. Fig. 2 an end view of the same.

Similar letters of reference indicate corresponding parts in the two figures.

To enable those skilled in the art to fully understand and construct my invention I will proceed to describe it.

A, A, represent two parallel ties on which the ways B, B, of a log-carriage are fitted.

C, is a frame of rectangular form on which a circular-saw arbor D, is placed in suitable bearings, and E, is the saw which is attached to one end of the arbor D.

The frame C, is attached at one end to one of the ties A, by means of a bolt or pivot *a*. To the opposite end of the frame C, there is attached a horizontal arm F, said arm projecting from the frame at right angles and having a screw rod G, passing through it, the arm F, serving as a bearing for the screw rod. The screw rod G, is fitted in a nut H, which is secured to the tie A, directly beneath the arm F. To one end of the screw rod E, there is attached a crank wheel I.

From the above description it will be seen that by turning the screw rod E, the frame C, may be moved laterally on the pivot or bolt *a*, as a center, and that the saw E, may be adjusted laterally so that in gigging back the log the saw may be moved free or clear from the log and the latter prevented from being marred by the former. The saw also may be so adjusted as to avoid all binding in its kerf as it may be moved to conform in a measure to cut in the direction of the grain of the wood the frame being capable of ready adjustment by the attendant.

I do not claim broadly the placing of the saw and its shaft upon an adjustable frame, but,

Having thus described my invention, what I claim as new and desire to secure by Letters Patent is—

The arrangement of the pivot *a*, upon which the adjustable frame C turns, in front of the cutting edge of the saw E as herein shown and described, whereby the angle of the face of the saw blade may be carried at pleasure without changing the position of the cutting edge, all as set forth.

WM. H. AULD.

Witnesses:
ROBERT F. RATCLIFF,
THOS. D. EVANS.